Nov. 16, 1943.  F. E. THOMAS  2,334,656
RACE TRACK
Filed March 11, 1942  2 Sheets-Sheet 1
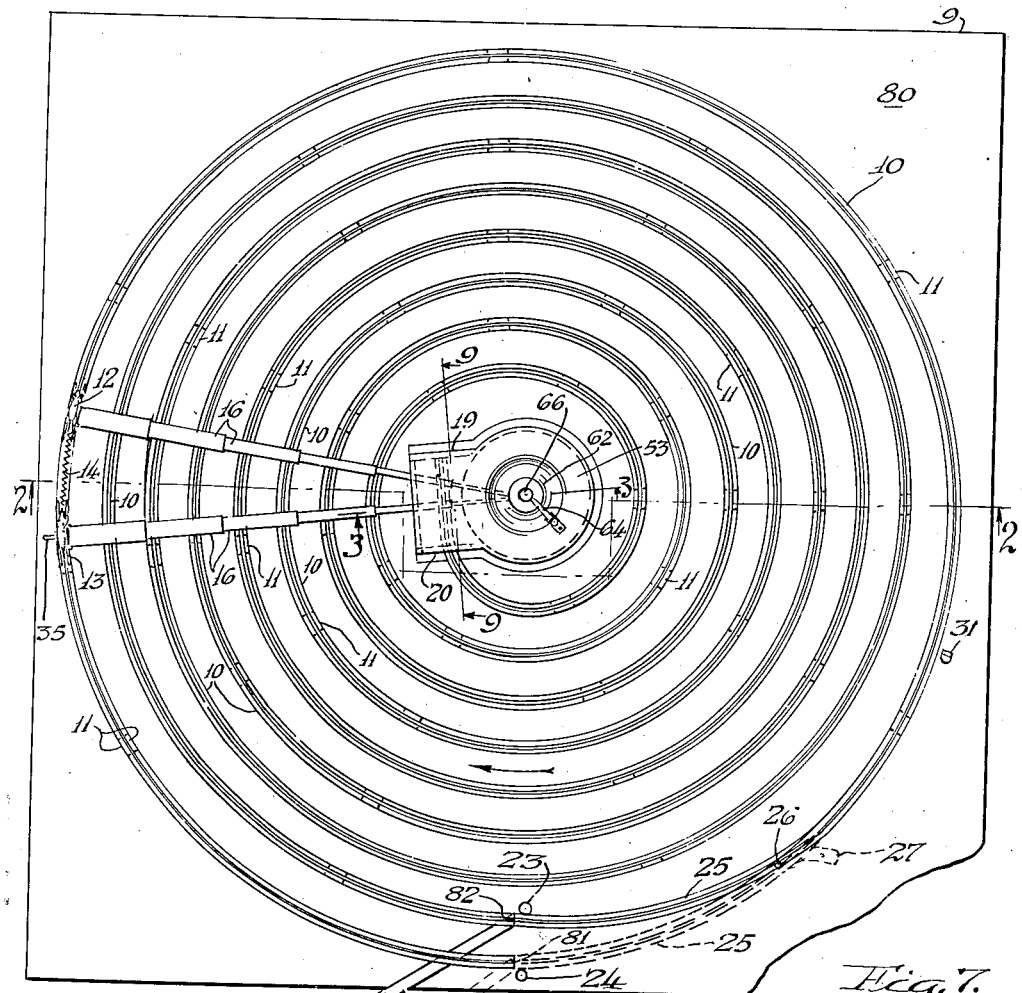
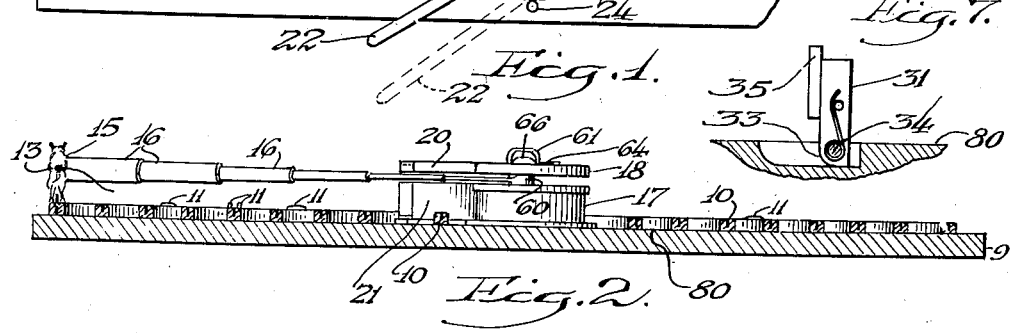
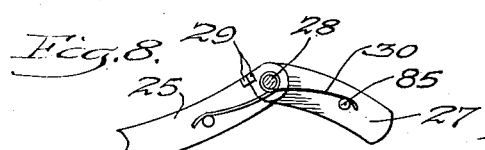
Inventor:
Frank E. Thomas
By [signature]
Attorney

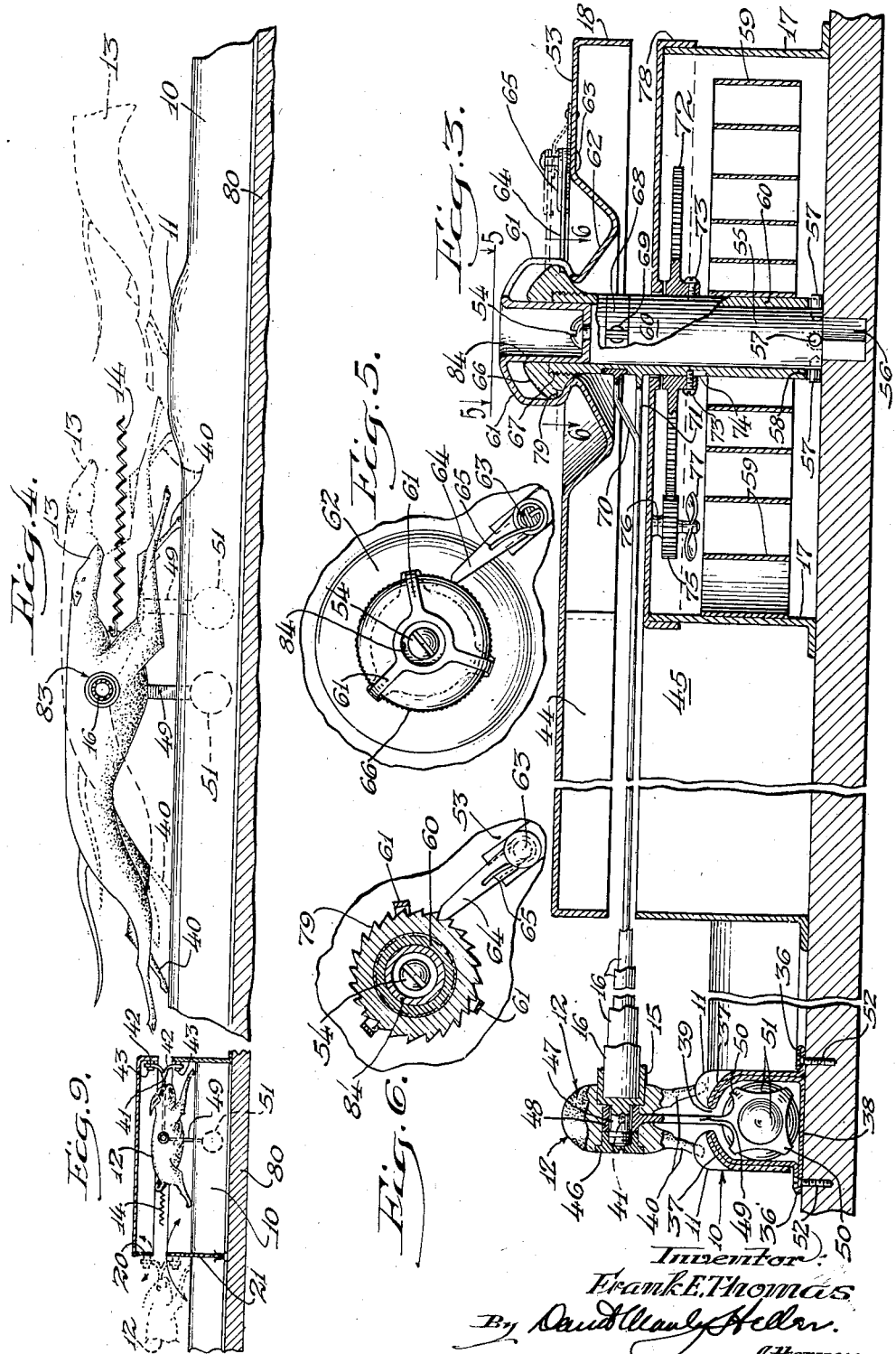

Patented Nov. 16, 1943

2,334,656

UNITED STATES PATENT OFFICE 2,334,656

RACE TRACK

Frank E. Thomas, Chicago, Ill.

Application March 11, 1942, Serial No. 434,229

5 Claims. (Cl. 272—31)

My invention relates to toy type race tracks.

One object of my invention is to provide a circular outer track and a spirally shaped inner track and switch means whereby an animal may be caused to run in the outer circular path continuously, and at will by the operator, and by use of a switching means cause the said animal to run on a spirally shaped circuitous track terminating at the approximate center of the trackage system, causing an animal to be concealed from pursuit by another animal within a trapping means.

Another object of my invention is to provide simple means for effectively causing the said animals to leap and bound simulating the actual running action of such animals.

Another object of my invention is to provide frictionless support means for the said animals when operating within the outer or inner spirally shaped trackage means.

A still further object of my invention is to provide resilient connecting means between the leading animal and the animal following in pursuit thereof, so as to provide intermittent motion as well as differential motion between the two animals when rotating thru the trackage means provided for operating the same.

Other objects, advantages, and features resident in my invention will become apparent from an examination of the accompanying drawings, and the elucidation contained in the ensuing description wherein like symbols are used to designate like parts and in which:

Fig. 1 is a top elevational view of my invention.

Fig. 2 is a longitudinal cross-sectional view on the line 2—2 of Figure 1.

Fig. 3 is a longitudinal cross-sectional view on the line 3—3 of Figure 1.

Fig. 4 is a fragmentary and enlarged view showing the means utilized for imparting to the animal a leaping and bounding action.

Fig. 5 is a fragmentary elevational view looking in the direction 5—5 of Figure 3.

Fig. 6 is a transversal cross-sectional view on the line 6—6 of Figure 3 showing in enlargement the check pawl means utilized to facilitate the winding of the motivating power or spring element.

Fig. 7 is a fragmentary detailed view showing the structural element used for arresting the reversed motion of the animals when winding the spring or power motivating means.

Fig. 8 is a detailed view showing the manner in which the switching means will be automatically thrown back, from its connection to the spiral trackage, to the circuitous or circular outer track simultaneously and automatically with the spring winding operation.

Fig. 9 shows a cross-sectional view on the line 9—9 of Figure 1, indicating the trap door details of the trap for concealing the leading animal therein.

Referring, more particularly, to the views, in Figure 1, 80 designates a suitable support or platform for the invention upon which is mounted the trackage 10, a portion of this trackage being adapted to form a circular outer track having a space or gap in between the pivot 26 and the terminus of the track 81. The spiral track which continues within the confines of the outer circular track is spirally shaped and leads towards the center as indicated. The spiral track begins at a point 82 and continues towards the central point in spiral formation.

The switch means 25 is composed of a piece of trackage, having an extension 27 and a manipulating handle 22. The manipulating handle is adapted to cause the switching portion of track 25 to be motivated in between the stop pins 23 and 24, thus confining the operation of the animals 12 and 13 within the limits and bounds of the outer track 10 when the switch portion of track 25 is in the position shown by the dotted lines in Figure 1, or by switching the connection to the path of the spirally shaped track when the switching portion of track 25 is connected to the terminus 82 thus causing the animals to continue in the spirally shaped track and proceed toward the central portion where the trap 19 will permit the leading animal to be concealed therein.

In Figure 8, the detailed structure of the switching means permitting automatic operation by the pin 35 is shown. It comprises, a lever 27 pivotably mounted, and, as shown, it is in its outermost angular relation with element 25, the abutments 29 permitting movement toward element 25 by virtue of spring element 30 pivoted at 28, the termini of the spring being anchored by the pins 85. This arrangement permits the lever 27 to be tripped by pin 35, when pin 35 is moving in one direction, and will escape tripping when pin 35 moves in the opposite direction.

The central housing of the device is generally designated by 17, and the cover by the numeral 18. The swinging doors 20 and 21 are more clearly elucidated in the cross-sectional view in Figure 9. The animal 12 represents a hare, and the animal 13 represents a whippet in pursuit thereof. The hare is connected by means of a telescopic series of rods to the terminus 15 of the telescopic system of rods, comprised of the reduced telescopic tube sections 16 and motivated about the center as a fulcrum.

The whippet 13 is likewise mounted on a similar telescopic rod structure operable independently from the rod supporting the hare, and being interconnected by the resilient element 14 at their outer extremities only, in order that the resilience of the spring will cause it to extend and compress thus imparting to the motions of the rabbit and the whippet an intermittent action which will permit the whippet to give ostensibly the impression that it is gaining on the rabbit, or when the resilience of the spring exerts a repellent action to the whippet or an advancing action to the rabbit whence the whippet will never catch up with the rabbit but appear to be gaining and losing distance by the varied action provided by the resilient spring element 14.

The trackage system at numerous points or intervals will be provided with a protuberance 11 which will give a leaping and bounding type of action to both the hare and the whippet as can be seen in Figure 4. When the animal's forelegs approach the protuberance 11, being that the animal is pivotally mounted at the point 83, the forelegs will cause the animal to incline angularly in an upward direction, then the forelegs will pass over the forward part of the protuberance 11 and the rear legs of the animal will incline downwardly, thus alternately the forepart of the animal's body will be inclined upward and downward alternately with respect to the rear portion of the animal which will likewise incline downwardly and upwardly, respectively, thus simulating the natural leaping and bounding of those animals when in flight or in pursuit of one another.

Either animal 12 or 13 is suitably bored out at 83 in order to be mounted on the first telescopic section 15 which is provided with a threaded shank portion 47, allowing a smooth portion thereof to support the link 48 and the nut 46 which holds the same rotatably and swivelly in place.

The animal 12 is provided with the legs 40 which straddle the central opening 39 provided in the trackage and are so made as to contact the protuberances 11 as heretofore explained (see Figure 3). In this figure it will also be noticed that the element 48 has a central web extension 49 and terminates in the housing 50 having ears bent over to hold the ball 51 in place thus the ball is caused to contact two sides and the bottom of the track and operate rotatably, thus minimizing the frictional loss of power.

The track is preferably built in relief at the upper portion 37 so that it will give the supporting element 49 freedom of action during the motion or period of rotation. The track is preferably, made of stamped material being flanged over as at 36 and bent over as indicated at 37 and its base 38 is held down to the base board support 80 by virtue of the countersunk screws 52.

The spring housing 17 is provided with a cover plate 78 and houses the flat coil spring 59 which is secured to the central tubular bearing 60 which rotates about the standard 55, which also has a square shank 56 imbedded in the base 80 of the device.

The sleeve 60 is provided with slotted portions 58 adapted to straddle the pins 57 which are driven into the standard 55. The sleeve 60 is connected by a threaded portion 67 to the knob 66 which is, preferably, knurled so that it can be conveniently manipulated when it is desired to charge the spring 59. The knob 66 is pulled upward so that the slotted portions 58 clear the pins 57 and thus offer freedom of rotation to the knob.

The sleeve 60 is secured to one end of the spring 59, the other being secured to the housing 17. The sleeve 60 has secured thereto the gear 72 and by virtue of the screws 73 which have extensions working in the slotted portions 74 in a manner similar to a feather key arrangement, thus causing the key to rotate integrally with the sleeve 60 yet permit the sleeve 60 a longitudinal movement without disturbing the position of the gear 72 in its meshed relationship with the pinion 75 idling about the support 76 on a shaft which has an extension to which is secured the air fan type of governor 77 so as to govern the rotational action of the spring and more or less control the quick dissipation of the energy stored therein.

The upper portion of the sleeve 60 has integrally welded thereto the initial support 71 of one of the series of sleeves 16 supporting the rabbit element 12. It is also provided with a recessed portion permitting the bent lever or extension 70 which is secured in working fit relation with the recess in the sleeve 69 by the strap portions 68 in turn secured in place by virtue of the rivet 69, thus giving the extension 70 as distinguished from the extension 71 freedom of action to follow the movement of the element 71 depending on the resilient connection 14 for carrying the extension 70, to which are secured the various telescopic sections 16 leading to the whippet animal, the animal being pivotably supported thereon in like manner as has been elucidated for the mounting of the rabbit 12 at the extreme outer point of the telescopic arm.

To the first extension 15 is secured a pin member designated 41 having bent portions 42 to which are suitably secured rubber bumper elements 43 so that this structure will act as a buffer, and, as can be seen, since element 41, is somewhat longer than the distance from the nose of the animal to the center of the telescopic section 16, the rubber bumper portions 43 will be caused to impact the doors 20 and 21 before the animal enters the trap thus protecting the head of the animal and also by impacting the wall sections 44 and 45 causing the animal 12 to be arrested at a point ⅛ of an inch or ¼ of an inch away from the said walls and preventing damage thereto, when the animal completes its rotation on the inner or spiral track. The doorways 20 and 21 are pivotally connected as shown and operate in both directions so as to permit the animal to be brought out as well as to be concealed therein when the operation is terminated.

The cover member 19 is provided with the indented structure 62 and a straight horizontal portion 53, also the triple bar support 61 so as to provide a central hub 84 to be secured to the stud 55 by virtue of the screw 54 and maintain the same in a fixed relationship with respect to the spring cage 17.

The knob element 66 is provided with an undercut ratchet tooth arrangement 79 in order to permit the pawl 64 pivoted at 63 to be kept in engagement by virtue of the spring 65, to provide checking movement when the spring element 59 is being wound up and when the hand has to release the knob in order to grip it and operate it rotatably until continuous winding of the knob will tend to completely charge the spring.

The operation of the device is as follows: After the spring element 59 has been charged and the track switch 25 is in the position indicated in dotted lines Figure 1, the pawl 64 being released will permit the animals to run on the outer circuitous lap 10. The animals will thus pursue one another by virtue of the telescopic rods 16 supporting the animals, permitting them to work over the protuberances 11 and thus simulate the leaping and bounding action of these animals in flight or in pursuit of one another.

The resilient element 14 as heretofore elucidated will permit some compression or expansion thereof thus giving the animals the intermittent action and, ostensibly, conveying the impression that they are gaining or losing, intermittently, thus maintaining a greater degree of interest of the one operating the toy, then by manipulating the switch lever 22 causing the switching trackage portion 25 to be connected to the terminus 82 of the inner spirally shaped tracks, the animals then will continue pursuit on the spirally shaped track until they reach the trap doors 20 and 21, where the hare or leading animal will be caused to be confined therein and the whippet will remain outside; moreover, by the impact of the buffer pin 41 impacting the walls 44 or 45 of the trap, the movement of the rabbit will be arrested whereas the resilience of spring 14 will be caused to take up the acquired momentum of the whippet 13 causing it to rebound several times back and forth in front of the doors 20 and 21 thus giving the impression of an earnest attempt to pursue the rabbit into the trap; the resilient spring affording, thus, a very interesting action at that point and thruout the circuitous operation of the animals in pursuit of one another both on the outer track as well as on the inner spiral track.

After the animal has been arrested in the trap 19 as heretofore explained, it is now necessary to charge the spring once again. First, the knob element 66 is pulled upward so as to disengage the sleeve 60 from the pins 57, which permits freedom of rotation of the element and permits charging the spring to its ultimate capacity, the ratchet 79 and the check pawl 64 controlling the action.

At the initial operation of the winding action of the spring in a counterclockwise manner, the telescopic rod bearing the whippet being connected by the spring 14 to the rod supporting the hare will cause the rabbit to be moved out of the trap 19 by virtue of the doors 20 and 21, which swing in both directions, and will cause the same to work in unison with the ball bearings 51 in the spiral trackage until the same are brought to the terminus 82, whence they will be caused to connect with the outer track 10 to continue the rotation on the outer track 10.

When the whippet 13 runs on the switching portion 25 shown in full lines and thence continues to reach the outer track 10, the pin 35 secured to the whippet 13, will engage the portion 27 of the switch means thus causing the switching portion of the track 25 to be brought in communication with the terminus 81 of the outer track, then the pin 35 will be arrested by the stop 31 which will hold both animals in that relative position until the spring is fully charged. The pin 35 will not be able to pass the element 31 as indicated by Figure 7, that being made up of a piece of rigid material pivoted at 32 and mounted so with respect to the spring 34 by virtue of the radial portion 33 confining its movement in one direction but not in the other, so that when the pin 35 strikes member 31 while the device is turning counterclockwise, it will not be able to pass it, but when the animals are in rotation clockwise after the spring is released then they will pass the element 31 because it permits of its bending forward against the spring tension 33 and by virtue of rounded portion 33 thus permitting the telescopic rods and pin 35 to pass in a clockwise direction but not in a counterclockwise direction.

In this connection it should be noted that element 31 is pivotably mounted, the radial base portion 33 extending but for a segment of 90° whereas the remaining base portion 87 being right angled will permit movement only in the direction tending to depress the spring 34.

When the animals are operating on the outer track, the switching element 25 is secured to the extension 27 at the point 28 and by virtue of the abutments 29, and the spring 30, which permits the element 27 to yield to the pin 35, when the telescopic sections 16 are operating in a clockwise direction, but will engage the element 27 as when the spring 59 is being charged and the sections 16 are being moved in a counterclockwise direction, the pin 35 will engage the element 27 and cause the switching portion of track designated 25 to be moved over to the position shown in dotted lines and connect with the outer track at the point 81. Thus the operation will be continuous in the outer path until switched to the inner path which spirally leads to the trap door and conversely when the spring is being charged the telescopic elements will automatically be extended by their movement thru the spirally shaped track in the counterclockwise direction and automatically trip the switching means 25. The pawl 64 may then be released and the cycle of operation continued, the animals moving in pursuit around the outer track, then by manipulation of handle 22 the operation or pursuit will continue on the spiral track until the leading animal is concealed in the trap.

The herein embodiment of my invention reveals a preferred form and hence the right is reserved to all modifications coming within the spirit and scope thereof.

Having thus revealed my invention what I claim as new and desire to secure by Letters Patent is:

1. In a device of the character described, outer trackage means, inner trackage means of spiral formation, common trackage switch means adapted to close the circuitous path of the said outer trackage means and the said inner trackage means alternately, automatically adjustable telescopic elements secured concentrically with respect to said outer trackage means, and adapted to be confined rotatably and alternately within the said outer and the said inner trackage means, and trip means secured to the said automatically adjustable telescopic elements adapted to motivate the said common trackage switch means to close the circuitous path of the said outer trackage means.

2. In a device of the character described, outer trackage means, inner trackage means of spiral formation, common trackage switch means adapted to close the circuitous path of the said outer trackage means and the said inner trackage means alternately, automatically adjustable telescopic elements secured concentrically with respect to said outer trackage means, and adapted to be confined rotatably and alternately within the said outer and the said inner trackage means, and resilient connecting means interconnecting the outer extremities of the said telescopic elements.

3. A device of the character described comprising, motive power means, telescopic supporting means rotatably secured to the said motive power means, animal elements pivotably secured to the outer extremities of the said telescopic supporting means, animal support and bearing means pivotably secured to the outer extremities of the said telescopic supporting means, and universally confined within track means, and track means.

4. A device of the character described comprising, motive power means, telescopic supporting means rotatably secured to the said motive power means, animal elements pivotably secured to the outer extremities of the said telescopic supporting means, animal support and bearing means pivotably secured to the outer extremities of the said telescopic supporting means, and universally confined within track means, track means, the said track means, comprising outer track means, inner track means of spiral formation, and common switching means adapted to close the circuitous path of the said outer track means and the said inner track means alternately, and trip means secured to the said telescopic supporting means adapted to motivate the said common switching means to close the circuitous path of the said outer track means.

5. In a device of the character described, spirally-shaped trackage means, telescopic elements adapted to be confined rotatably in the said spirally-shaped trackage means, trackage switch means adapted to convert into an isolated circuitous path the outermost portion of the said spirally-shaped trackage means, and trip means secured to the said telescopic elements adapted to motivate the said trackage means to close the circuitous path of the outermost portion of said spirally-shaped trackage means.

FRANK E. THOMAS.